June 10, 1941.  G. A. TINNERMAN  2,244,978
SHELF-SUPPORT MOUNTING OR THE LIKE
Filed Feb. 23, 1940
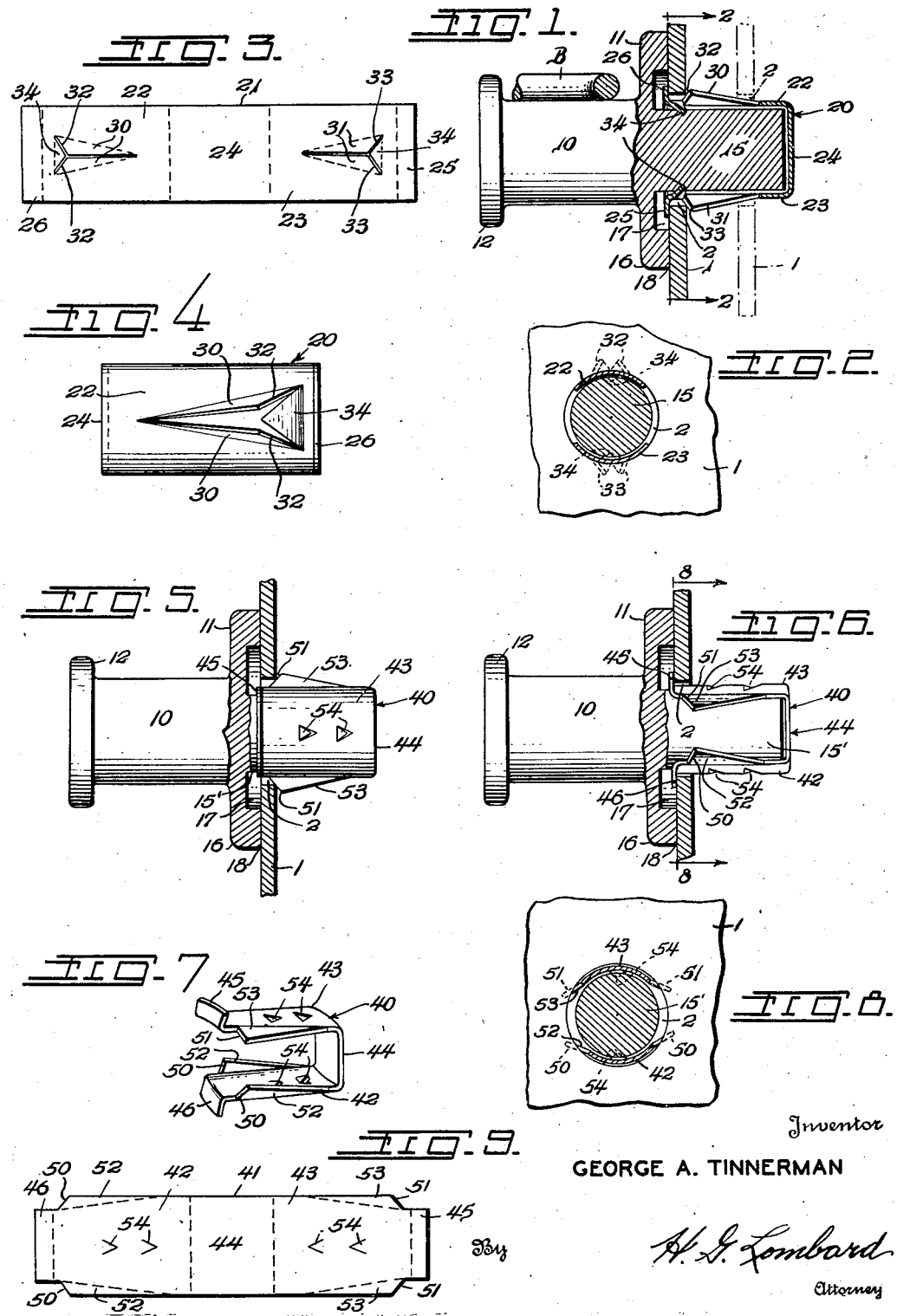
Inventor
GEORGE A. TINNERMAN Patented June 10, 1941

2,244,978

UNITED STATES PATENT OFFICE 2,244,978

SHELF-SUPPORT MOUNTING OR THE LIKE

George A. Tinnerman, Cleveland, Ohio, assignor to Tinnerman Products, Inc., Cleveland, Ohio, a corporation of Ohio

REISSUED
SEP 5 1944

Application February 23, 1940, Serial No. 320,480

16 Claims. (Cl. 85—36)

This invention deals with improvements in the art of mounting a shelf support, knob or like object onto an apertured wall member for use in supporting sliding shelves or trays employed in refrigerators and similar cabinet structures or as a means for attaching or securing any like object to a wall member in various other related types of installations. The present application is a continuation-in-part of applicant's prior co-pending application Serial Number 152,830, filed July 9, 1937, and since issued as United States Patent Number 2,198,186, April 23, 1940.

A primary object of the invention is to provide a simple, inexpensive and highly efficient form of mounting for a shelf support or the like which may be secured to a wall member by an operation taking place entirely from the front or outer face of the work. This arrangement is of considerable advantage and most important in the case of many constructions, such as refrigerators and the like, since the mounting of the shelf supports on the refrigerator inner lining may be accomplished quickly and easily as the last step in the method of assembly inasmuch as it is not necessary to obtain access to the rearward side of the refrigerator lining or wall onto which the shelf supports are to be mounted.

A further object of the invention is to provide a mounting for a shelf support or the like which is especially designed to be secured to a wall member in such a way that only a minimum amount of friction and bearing force takes place between the shelf support and the outer face of the wall member engaged thereby. Such an arrangement is especially useful and advantageous in connection with the refrigerator inner linings which are usually porcelained for purposes of cleanliness and neat appearance, wherefore the usual nut and screw type attaching means and various other similar fastening devices heretofore employed with shelf supports now in common use have been found objectionable in that the porcelain is often chipped or cracked by the bearing forces set up with the result that a marred, defaced and unsightly appearance of the visible surfaces of the refrigerator lining or other wall member frequently occurs.

Another object of the invention is to provide an improved mounting for a shelf support or similar object which is provided with a plain, ordinary connecting stem cooperating with a simple, inexpensive form of spring holding clip adapted to secure the object onto a wall member by an operation taking place entirely from the forward side thereof without the need of special backing or retaining means at the rearward side thereof.

A still further object of the invention is to provide an improved mounting for a shelf support, knob or the like molded from plastic, nonresonant material sufficiently hard in its completed form to resist wear due to the sliding of the shelf thereon, and comprising an integral connecting stem of plain, simple configuration cooperating with a spring clip device especially designed for locking the mounting automaticaly in final applied position on a wall member in an assembling procedure taking place entirely from the forward side thereof.

A more specific object is to provide in such an installation of a shelf support, knob or like part, a mounting arrangement comprising an integral connecting stem on such part having an independent metallic securing device cooperating therewith, said securing device embodying a novel form of spring clip having means designed for substantial snap fastening engagement in a socket opening in a wall member and being adapted to take the thrust and strain in the applied mounted position of the shelf support or other part thereby minimizing possibility of fracture or breaking of the integral connecting stem thereof when put to use.

Further object of the invention, and other new and useful features in the construction, arrangement and general combination of parts, will be readily apparent to those skilled in the art as a description thereof proceeds with reference to the accompanying drawing in which like reference characters designate like parts throughout the same, and in which:

Fig. 1 is a vertical sectional view of a mounting for a shelf support or like object illustrating one embodiment of the invention, the spring clip being illustrated in section;

Fig. 2 is a sectional view taken on line 2—2 of Fig. 1, looking in the direction of the arrows;

Fig. 3 illustrates a blank or sheet metal section from which the spring clip shown employed in Fig. 1 is constructed;

Fig. 4 is an enlarged side elevational view of the spring clip per se constructed from the blank of Fig. 3, showing in detail the locking and anchoring means thereof;

Fig. 5 is a vertical sectional view of a further embodiment of the invention in which another form of clip is shown in side elevation;

Fig. 6 is a view similar to Fig. 5 showing the clip in edge elevation;

Fig. 7 is a perspective of the clip per se shown employed in Figs. 5 and 6;

Fig. 8 is a sectional view of Fig. 6 taken on line 8—8, looking in the direction of the arrows; and, Fig. 9 represents a section of sheet metal from which the clip shown in Fig. 7 is constructed.

While the description refers, more particularly, to a shelf support mounting, the invention so far as the general type of spring clip securing means is concerned, is equally adaptable to use as the means for attaching or mounting any related form of object or article of manufacture constructed of any suitable material as may be necessary or desirable. However, the use of plastic, non-resonant material in providing shelf supporting studs is especially advantageous in the case of insulated cabinets and the like wherein an inner metal lining is employed, inasmuch as a supporting stud may then be mounted directly on the lining and put to use without setting up undesirable vibrations upon movement of the shelf thereon. This advantage may be appreciated when it is considered that the lining in a refrigerator, for example, is usually of such a large plane surface as to act as a substantial sounding board amplifying initially slight vibrations which occur in the case of metal to metal contact between the shelf and a metallic supporting stud.

A most important problem involved in the use of such shelf supporting studs resides in the fact that the sheet metal wall surface or lining, as in a refrigerator, is usualy accessible from one side only in a completed installation, wherefore the securing means provided for the stud must be capable of being applied to rigid, positive fastening engagement entirely from the accessible side. To this end, the present invention contemplates generally the provision of a connecting stem formed integrally on the supporting stud in the molding operation and cooperating with a spring clip device designed for substantial snap fastening engagement in a socket opening provided in the wall member in mounting the stud in fixed, rigid relation thereon by a simple assembling operation taking place entirely from the forward side thereof.

Referring now, more particularly, to Fig. 1 of the drawing, a preferred form of shelf supporting stud is shown in connection with a fragment of a refrigerator lining or casing which, of course, may be a fragment of any similar member to which it is desired to attach a stud, knob, or the like in accordance with the present invention. The lining is usually a sheet metal wall having a porcelain or enameled surface which forms a highly desirable finish but renders the mounting of shelf supporting studs thereon a difficult problem in that cracking and chipping of the porcelain or enamel occurs all too frequently in the application of the securing means for such studs. A well known type of shelving comprises a parallel wire grid having a relatively heavy wire or rod beading B, around the periphery thereof, this beading resting in the guideway intermediate spaced shoulders formed on the supporting stud, as shown. In order that the supporting studs may be secured thereto, the lining or wall member 1, Figs. 1 and 2, is provided with apertures or socket openings 2 formed therein at determinately located points depending on the position it is desired that the shelf be supported in a completed installation. Such perforations are usually punched in the plate constituting the refrigerator lining or other wall member prior to the assembly thereof in a completed structure whereupon they become accessible from one side only; and it is this condition which makes it essential that the securing means for mounting a supporting stud be capable of installation to complete, positive fastening engagement in a socket opening entirely from the accessible side.

As shown in Fig. 1, the shelf support 10, knob or the like, may assume the form of a substantial spool-shape having a groove in the body portion thereof providing spaced shoulders 11, 12 between which the shelf rod B may rest, the outer shoulder 12 preventing the shelf rod from sliding off the end thereof. Thus, the said shoulders 11, 12 of the shelf supporting stud present a substantial guideway for the shelf beading such that the shelf is freely movable thereon and sliding thereof is facilitated should it be desired to move the shelf from the refrigerator for cleaning, etc. And inasmuch as the studs are preferably constructed of hardened plastic material, the same not only are strong and durable, but also nonresonant thereby permitting ready sliding of the shelf rod thereon without rattling, squeaks, vibration and other annoying sounds which result from sliding a shelf over metallic shelf supporting studs.

In the use of such hardened plastic materials in providing a shelf supporting stud in accordance with the present invention, it is possible to mold the same, at little or no added cost, with an integral connecting stem 15, and a flange or skirt 16, preferably recessed as at 17 adjacent said stem 15, to present a substantial peripheral bearing surface 18, serving in a manner and for a purpose presently to be described. Preferably the stem 15 is cylindrical and so designed as to be partly received within the peripheral skirt 16, it being quite obvious that the same may be of any other suitable cross-section, form or shape, and if desired, may comprise simply an extension of a plastic stud molded solid without a flange or skirt.

The shelf support thus provided is secured by the connecting stem portion 15 thereof received in the socket opening 2 in the wall member together with a spring holding clip, designated generally 20, that is provided with what may be termed a double locking means which firmly locks itself in place and also anchors the connecting stem in assembled position in such socket opening.

The clip device 20 may be constructed from a simple section 21 of sheet metal such as represented in Fig. 3 which is bent substantially as indicated by the transverse dotted lines to provide a generally U-shaped bushing or the like, comprising legs 22, 23, spaced by an end portion 24 and having suitable head sections 25, 26 formed from the free end portions thereof. A spring clip of this character is particularly advantageous by reason of its relatively simple construction lending toward economical quantity production in that the same may be produced from relatively small, inexpensive sections of sheet metal, preferably spring metal or metal having spring-like characteristics, and which are most economically obtained from ordinary strip stock without loss or waste of material.

As best seen in Fig. 2, the legs 22, 23 of the spring clip are bent to a contour corresponding substantially to the cross-section of the connecting stem 15, and otherwise designed of a slightly less spacing than such cross-section such that said leg members must be spread apart slightly on being assembled onto the connecting stem to frictionally and grippingly embrace the same in fully assembled relation therewith.

The legs 22, 23 thus form the shank of the clip device and at least one of said legs, preferably both, are provided with means having the double purpose of anchoring the spring clip in assembled relation on the connecting stem and also locking such assembly in the socket opening in the wall member in the final applied mounted position of the shelf support thereon. In the form of the invention shown in Figs. 1-4 inclusive, such locking and anchoring means may be provided on the leg members 22, 23, of the spring clip by means of substantially Y-shaped slit areas with the adjoining longitudinal portions 30, 31, bent outwardly substantially along the lines indicated in Fig. 3 to the position best seen in Fig. 4 to provide yieldable wings or the like projecting outwardly out of the planes of the leg members from which they are thus struck and formed. The outer extremities or end edges of the wings 30, 31, are inclined and in this relation assume the form of substantial cam shoulders 32, 33 adapted for snap fastening, locking engagement in the socket opening in the wall member, as presently to be described.

It will be understood that such shoulders 32, 33 are designed to cooperate with the head sections 25, 26 in locking the spring clip in the socket opening in the wall member and, to this end, are spaced from said head sections a suitable distance depending upon the thickness of the wall member adjacent the socket opening such that said shoulders 32, 33 and head sections 25, 26, firmly and rigidly engage the wall member on its opposite faces as seen in Fig. 1. Preferably, said shoulders 32, 33, are inclined as shown, to present tapered cam surfaces functioning in the manner of substantial cam shoulders which not only permit the use of a certain size spring clip for mounting a shelf support on wall members of different thicknesses but also, ensures a positive, self seating of the clip in applied position in the socket opening and consequently provide automatically a firm, rigid mounting of the shelf support or other object on the wall member.

Between the free ends of each pair of wings 30, 31, Fig. 3, there is presented a pointed anchoring prong or tongue 34 which is bent inwardly of the leg member from which it is formed in position to dig into and become embedded in the connecting stem 15 of the shelf support when assembled with the spring clip. Thus it is to be appreciated that the arrangement just described for providing the pairs of yieldable wings 30 and 31 together with anchoring prongs 34 involves a simplified, highly practical construction which requires only a simple stamping and forming procedure by which these securing elements in a group may all be provided by one and the same operation, if desired, making for economy in the cost of tools and time required for quantity production.

From the foregoing, it will be understood that in assembling the shelf support and spring clip, the legs 22, 23 of the clip are expanded as necessary and forced onto the free end of the connecting stem 15 of the shelf support to assembled relation substantially as shown in Fig. 1, in which position the prongs or tongues 34 dig into and become embedded in the material of the connecting stem under the gripping force of said legs 22, 23, to anchor the clip in such assembled relation on the connecting stem 15 against loosening and reverse movement. While this arrangement has been found highly practical, the present invention fully contemplates the provision of other equivalent forms of anchoring means such as barbs, teeth and the like which are so provided on the legs of the clip as to permit movement thereof in an axial direction to assembled relation with the connecting stem but resist any movement in an opposite direction toward loosening and shifting from such assembled relation. In any event, the resiliency of the legs of the spring clip tends to bind the anchoring means 34 in substantial embedded relation with the connecting stem 15, such that for all practical purposes, the spring clip cannot slip or become easily removed when once assembled onto the connecting stem in providing a permanent, locked mounting that is best suited to assemblies that must endure much vibration and where removal is seldom necessary. In another relation, the clip may be designed for a locked but removable type of mounting for use in assemblies which may require an occasional separation of the parts secured; that is accomplished by predetermining the amount of desired pull for removal of the connecting stem from the clip and designing the anchoring prongs 34 for the correct amount of bite for this purpose. In some instances, the anchoring means 34 may be omitted and the connecting stem secured solely by the frictional gripping action of the resilient legs 22, 23 of the clip in providing a slidable bushing arrangement which is advantageously employed, for example, where the connecting stem of the part secured is composed of relatively soft plastic materials such as cellulose acetates.

With the spring collar thus assembled on the connecting stem 15, the shelf support is applied to mounted position as shown in Fig. 1, in which the initial position thereof with respect to the wall member 1, is illustrated by the dotted line showing of said wall member. The leading end portion of the clip is snugly received in the socket opening 2 in the wall member and as the shelf support is advanced axially, the inclined longitudinal edges of the yieldable wings 30, 31 serve as substantial guide surfaces which gradually cam against the adjacent corner edges of the socket opening to cause said wings to flex or yield inwardly sufficient to permit the same to pass through the socket opening to the point at which the cam shoulders 32, 33, clear the socket opening. The said wings 30, 31 are thus free to spring outwardly toward their normal untensioned relation such that said cam shoulders 32, 33 engage the adjacent corner edge of the socket opening at the rearward side of the wall member. The head sections 25, 26 of the clip engage the forward side of the wall member and since such head sections are spaced from the cam shoulders 32, 33 a suitable distance depending on the predetermined thickness of the wall member, said head sections 25, 26 and shoulders 32, 33, cooperate in engaging at opposite faces of the wall member to lock the clip in applied position in the socket opening.

In the fully attached position of the spring clip, the wings 30, 31 tend to assume their normal untensioned relation, thereby exerting an expansive force on the tapered cam shoulders 32, 33, to urge the same to firm, positive, substantially locked engagement with the corner edges and adjacent area of the socket opening at the rearward side of the wall member under, what may be termed, continuously effective spring holding action. Of course, if a positive locked mounting is desired, the shoulders 30, 31, may be designed more pronounced to present substantial abutments engaging a material area or face of the wall member at the reverse side thereof. However, the provision of tapered, substantial cam shoulders on the wings is more advantageous in that the use of a certain size clip with wall members of several thicknesses is possible and also, a positive, self seating of the clip in rigid mounted position is ensured by reason of the expansive action supplied by the wings to the said tapered cam shoulders 32, 33 to cause the same to ride on the corner edges of the socket opening to the point of most effective locked fastening engagement substantially as shown in Fig. 1. It is therefore to be appreciated that the spring clip securing means in this embodiment of the invention is always effective to cause the tapered cam shoulders to compensate for slight clearances and other manufacturing variations in the size of the socket opening and the thickness of the wall member, and likewise, any looseness or play in the connection after a period of use is immediately taken up such that an installation embodying the improved mounting of the present invention is rigid and positive throughout its entire length of service.

On tightening of the shelf supporting stud in its final applied mounted position, the head sections 25, 26, of the clip are received in the recess 17 adjoining the connecting stem 15 such that the bearing surface 18 may be brought into close flush engagement with the adjacent face of the wall member in providing a firm, rigid seating of the shelf support in its final applied mounted position. In this relation, it is to be noted that the main part of the shelf support which bears directly on the exposed outer face of the wall member is the peripheral bearing surface 18 of the skirt or flange 16. Thus, the actual bearing area of the shelf support not only is reduced but extends over a relatively wide portion of the wall member. And since the wall member is provided usually with an enameled or porcelain finish, this arrangement is highly advantageous in that when a mounted shelf supporting stud is put to use as by placing an article on the shelf supported thereby, the resultant bending stress transmitted to the wall member is necessarily decreased and distributed over a comparatively large area wherefore danger of cracking or chipping of the enamel or porcelain is minimized and, in fact, practically eliminated. In any event, it will be appreciated that the present invention provides an excellent arrangement whereby the mounting of an object may be accomplished by an operation taking place entirely from one side of a wall member and therefore, is particularly suited for use in what are known as blind locations in which the rearward side of a wall member is not conveniently or readily accessible, and the complete installation of any mounting of an object thereon must necessarily be made from the forward side of the wall member, for all practical purposes.

In an alternate procedure for mounting the shelf support or like object employing the component parts of the installation just described, the spring clip may be so designed as to be applied to the socket opening in the wall member prior to the application thereto of the connecting stem 15 of the shelf support or other object to be mounted on the wall member. Thus, the spring clip would be first assembled in the socket opening in the wall member by a substantial snap fastening engagement of the cam shoulders 32, 33, on the yieldable wings 30, 31, to a position in which the head sections 25, 26 engage the adjacent face of the wall member and the legs of the clip would be in somewhat contracted condition to seat in the socket opening under continuously effective spring tension. The connecting stem 15 of the shelf support is then applied axially thereto, as shown in Fig. 1, to the position at which the bearing surface 18 of the skirt 16 is disposed in even, uniform bearing engagement with the outer face of the wall member. During this axial movement of the connecting stem 15, the spring clip is expanded in its initial seating in the socket opening such that the cam shoulders 32, 33, are forced outwardly into positive locking engagement with the adjacent corner edges of the socket opening at the rearward face of the wall member. The connecting stem 15 is thereby frictionally and grippingly retained by the spring clip in the tightened, fully mounted position on the shelf support on the wall member, whereupon the inturned biting prongs or tongues 34 become embedded in the connecting stem to prevent retrograde axial movement thereof from final applied position with the spring clip, which otherwise provides a positive locked mounting of the shelf support on the wall member, substantially as described in the procedure aforesaid.

Figs. 5-9 inclusive disclose a further embodiment of the invention which is substantially similar to that described with reference to Figs. 1-4 inclusive except for the specific structure of the spring clip. The spring clip 40, Fig. 7, in this form of the invention is constructed from a blank 41 of the general character represented in Fig. 9, the same being preferably provided from a sheet metal section of uniform width and which is most economically obtained from ordinary strip stock with a minimum loss or waste of material. The blank is bent as indicated by the transverse dotted lines to provide a generally U-shaped bushing or the like as shown in Fig. 7, comprising legs 42, 43, spaced by end portion 44. Said leg members preferably are shaped to correspond substantially to the cross-section of the connecting stem 15' as shown in Fig. 8, and are provided with head sections 45, 46, formed from the free end portions thereof.

At the corner portions of the strip, cut out areas are provided in substantially the manner shown in Fig. 9 to present substantial cam shoulders 50, 51, with the adjoining opposite longitudinal edge portions of said strip being bent outwardly out of the general planes of the respective leg members in the manner of yieldable wings 52, 53. At suitable points on the leg members 42, 43, one or more substantial prongs or anchoring teeth 54 are provided in any suitable way as by V-shaped indentations pressed from said leg members to project inwardly thereof.

Accordingly, with the spring holding clip thus provided, the device is assembled onto the connecting stem 15' of the shelf support or like object for attachment to mounted position on the wall member substantially as shown in Figs. 5 and 6. To this end, the inclined longitudinal edges of the yieldable wings 52, 53, serve in the manner of substantial guide surfaces camming the corner edges of the socket opening to cause a gradual inward compression of said yieldable wings sufficient to permit the same to pass through said socket opening to a point at which the cam shoulders 50, 51, suitably clear the socket opening. The said wings thereupon spring outwardly toward their normal untensioned relation such that the cam shoulders 50, 51, thereon engage the adjacent corner edges of said socket opening at the rearward side of the wall member substantially as shown in Fig. 5. In this relation, the inwardly projecting prongs or teeth 54 are effective to dig into and become embedded in the connecting stem 15' of the shelf support to anchor the clip therewith; the clip otherwise serves to lock the shelf support in mounted position on the wall member by means of the cam shoulders 50, 51, on the yieldable wings 52, 53 thereof substantially in the manner described with reference to the form of the invention shown in Figs. 1-4 inclusive.

In the provision of the improved mounting of the present invention, the several forms of clip devices disclosed, as designed for use with an integral connecting stem on the part to be secured, embody a number of decided advantages one of the most important of which is the comparatively low cost of the clips and the ease and facility with which such devices may be incorporated in an assembly and easily and quickly applied to a socket opening in a wall member in providing a fixed, rigid mounting for a shelf support or other object thereon.

Another advantage resides in the fact that in employing the present arrangement in the mounting of a plastic part, there is provided an extremely strong, durable and highly satisfactory installation by reason of the provision of the integral connecting stem portion together with independent metallic securing means designed to embrace and reinforce the plastic connecting stem and otherwise take the strain and thrust incident to the application and use of the plastic part in applied mounted position, thereby minimizing possibility of fracture or breaking of the plastic part, particularly in the connecting stem portion.

As respects this general organization comprising an independent metallic securing clip thus employed with a connecting stud to be secured in a socket opening in a wall member or the like, the present application is a continuation-in-part of copending prior application Serial Number 269,726 filed April 24, 1939, and claiming broadly such general organization embodying a clip related in construction and similar in function, operation and use to that of the present invention.

While this invention has been described in detail with specific examples such examples are intended as illustrations only, since it will be apparent to those skilled in the art that other modifications within the spirit and scope of the invention may be constructed without departing from teachings or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a mounting for an object to be attached to a wall member, said object having a connecting stem receivable in a socket opening in said wall member, a spring clip associated with said connecting stem, said clip comprising a sheet metal member adapted to embrace said connecting stem and means spaced from the leading end thereof for engaging said connecting stem in gripping relation therewith, a yieldable substantial wing element projecting outwardly out of the general plane of said sheet metal clip, said wing element having an edge portion presenting a substantial shoulder adapted for fastening engagement with said socket opening in the wall member.

2. In a mounting for an object to be attached to a wall member, said object having a connecting stem receivable in a socket opening in said wall member, a spring clip associated with said connecting stem, said clip comprising a sheet metal member having a pair of legs receiving said connecting stem therebetween, one of said legs having a yieldable substantial wing projecting outwardly out of the plane thereof, said wing defining a substantial shoulder adapted for fastening engagement with said socket opening in the wall member, and the outer edge of said wing being inclined to form a guide surface.

3. In a mounting for an object to be attached to a wall member, said object having a connecting stem receivable in a socket opening in said wall member, a spring clip associated with said connecting stem, said clip comprising a generally U-shaped sheet metal member having a pair of legs receiving the free end of said connecting stem therebetween, one of said legs being provided with a substantial wing projecting outwardly out of the plane thereof, said wing having an inclined outer edge defining a substantial cam shoulder adapted for fastening engagement with said socket opening in the wall member.

4. In a mounting for an object to be attached to a wall member, said object having a connecting stem receivable in a socket opening in said wall member, a spring clip associated with said connecting stem, said clip comprising a sheet metal member having a pair of legs receiving said connecting stem therebetween, each of said legs having a yieldable substantial wing element projecting outwardly out of the general plane thereof, said wing elements having edge portions defining substantial shoulders adapted for fastening engagement with said socket opening in the wall member.

5. In a mounting for an object to be attached to a wall member, said object having a connecting stem receivable in a socket opening in said wall, a spring clip associated with said connecting stem, said clip comprising a generally U-shaped sheet metal member having a pair of legs receiving the free end of said connecting stem therebetween, one of said legs having an integral yieldable substantial wing element struck and formed therefrom, said yieldable element extending generally longitudinally of said connecting stem and defining a shoulder portion projecting outwardly out of the general plane of said leg member on which it is provided, said shoulder portion being adapted for fastening engagement with said socket opening in the wall member.

6. In a mounting for an object to be attached to a wall member, said object having a connecting stem receivable in a socket opening in said wall member, a spring clip associated with said connecting stem, said clip comprising a generally U-shaped sheet metal member having a pair of legs receiving the free end of said connecting stem therebetween in gripping relation therewith, one of said legs having an integral yieldable substantial wing element struck and formed therefrom, said yieldable element extending generally longitudinally of said connecting stem and having a portion defining a substantial shoulder projecting outwardly of the plane of said leg member on which it is provided, said shoulder being adapted for fastening engagement with said socket opening in the wall member, and the longitudinal edge of said yieldable element diverging from the end adjacent the base of the U to form a guide surface.

7. In a mounting for an object to be attached to a wall member, said object having a connecting stem receivable in a socket opening in said wall member, a spring clip associated with said connecting stem, said clip comprising a generally U-shaped sheet metal member having a pair of legs receiving the free end of said connecting stem therebetween, integral yieldable wing elements provided on said legs, said yieldable elements extending generally longitudinally of said legs and defining shoulders projecting outwardly out of the general planes thereof, said shoulders being adapted for fastening engagement in said socket opening in the wall member.

8. In a mounting for an object to be attached to a wall member, said object having a connecting stem receivable in a socket opening in said wall member, a spring clip associated with said connecting stem, said clip comprising a sheet metal member adapted to embrace said connecting stem in gripping relation therewith, fastening means comprising a pair of opposing yieldable substantial wing elements projecting outwardly out of the general plane of said sheet metal clip, said pair of opposing wing elements defining cooperating shoulders adapted for fastening engagement with said socket opening in the wall member.

9. In a mounting for an object to be attached to a wall member, said object having a connecting stem receivable in a socket opening in said wall member, a spring clip associated with said connecting stem, said clip comprising a generally U-shaped sheet metal member having a pair of legs receiving the free end of said connecting stem therebetween in gripping relation therewith, at least one of said legs being provided with fastening means comprising a pair of opposing integral yieldable substantial wing elements struck and formed therefrom to project outwardly out of the plane thereof, said pair of wing elements having edge portions defining cooperating shoulders adapted for fastening engagement with said socket opening in the wall member.

10. In a mounting for an object to be attached to a wall member, said object having a connecting stem receivable in a socket opening in said wall member, a spring clip associated with said connecting stem, said clip comprising a generally U-shaped sheet metal member having a pair of legs receiving the free end of said connecting stem therebetween in gripping relation therewith, head sections provided from the free ends of said legs and means for anchoring the clip in assembled relation on said connecting stem, fastening means on each of said legs comprising a pair of integral yieldable substantial wing elements struck and formed therefrom to project outwardly out of the plane thereof, said cooperating wing elements having inclined edge portions defining substantial cam shoulders adapted for fastening engagement with said socket opening in the wall member.

11. In a mounting for a shelf support or other object to be attached to a wall member, said object having a connecting stem receivable in a socket opening in said wall member, a spring clip associated with said connecting stem, said clip comprising a generally U-shaped sheet metal member having a pair of legs receiving the free end of said connecting stem therebetween, at least one of said legs having its opposite longitudinal edge portions extending outwardly out of the general plane thereof defining substantial shoulders adapted for locking engagement in said socket opening, the outer edges of said longitudinal portions diverging from the end adjacent the base of the U to form guide surfaces.

12. In a mounting for a shelf support or other object to be attached to a wall member, said object having a connecting stem receivable in a socket opening in said wall member, a spring clip associated with said connecting stem, said clip comprising a generally U-shaped sheet metal member having a pair of legs receiving the free end of said connecting stem therebetween, at least one of said legs having its opposite longitudinal edge portions extending outwardly out of the general plane thereof, and the outer edges of said longitudinal portions first diverging from the end adjacent the base of the U to form guide surfaces and then converging toward the other end to form cam shoulders.

13. In a mounting for a shelf support or other object to be attached to a wall member, said object having a connecting stem receivable in a socket opening in said wall member, a spring clip associated with said connecting stem, said clip comprising a generally U-shaped sheet metal member having a pair of legs receiving the free end of said connecting stem therebetween, yieldable substantial wing elements provided from the opposite longitudinal edge portions of each of said legs extending outwardly out of the general plane thereof, and the outer edges of said wing elements first diverging from the end adjacent the base of the U to form guide surfaces and then converging toward the other end to form cam shoulders.

14. In a mounting for a shelf support or other object to be attached to a wall member, said object having a connecting stem receivable in a socket opening in said wall member, a spring clip associated with said connecting stem, said clip comprising a generally U-shaped sheet metal member having a pair of legs receiving the free end of said connecting stem therebetween, head sections provided from the free ends of said legs and means for anchoring the clip in assembled relation on said connecting stem, yieldable substantial wing elements provided from the opposite longitudinal edge portions of each of said legs extending outwardly out of the general plane thereof, and the outer edges of said wings first diverging from the end adjacent the base of the U and then converging toward the other end to form cam shoulders.

15. In a mounting for a shelf support or other object to be attached to a wall member, said object having a connecting stem receivable in a socket opening in said wall member, a spring clip associated with said connecting stem, said clip comprising a strip of sheet metal bent to provide a generally U-shaped member adapted to embrace said connecting stem in gripping relation therewith, a yieldable substantial wing element projecting outwardly out of the general plane of said sheet metal clip, said wing element extending longitudinally of said connecting stem and defining a substantial shoulder adapted for fastening engagement with said socket opening in the wall member.

16. In a mounting for a shelf support or other object to be attached to a wall member, said object having a connecting stem receivable in a socket opening in said wall member, a spring clip associated with said connecting stem, said clip comprising a strip of sheet metal bent to provide a generally U-shaped member adapted to embrace said connecting stem in gripping relation therewith, a yieldable substantial wing element projecting outwardly out of the general plane of said sheet metal clip, said wing element extending longitudinally of said connecting stem and having an edge portion defining a substantial shoulder adapted for fastening engagement with said socket opening in the wall member.

GEORGE A. TINNERMAN.